(12) United States Patent
Nakamura et al.

(10) Patent No.: US 10,538,147 B2
(45) Date of Patent: Jan. 21, 2020

(54) VEHICLE AIR CONDITION DISPLAY DEVICE

(71) Applicant: DENSO CORPORATION, Kariya, Aichi-pref. (JP)

(72) Inventors: Yuko Nakamura, Kariya (JP); Takeshi Yamamoto, Kariya (JP); Yoshinori Watanabe, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 61 days.

(21) Appl. No.: 15/562,629

(22) PCT Filed: Mar. 17, 2016

(86) PCT No.: PCT/JP2016/001534
§ 371 (c)(1),
(2) Date: Sep. 28, 2017

(87) PCT Pub. No.: WO2016/157791
PCT Pub. Date: Oct. 6, 2016

(65) Prior Publication Data
US 2018/0105023 A1    Apr. 19, 2018

(30) Foreign Application Priority Data

Apr. 2, 2015 (JP) ................. 2015-076212

(51) Int. Cl.
*B60H 1/34* (2006.01)
*B60H 1/00* (2006.01)
(Continued)

(52) U.S. Cl.
CPC ....... *B60H 1/3414* (2013.01); *B60H 1/00871* (2013.01); *B60H 1/00985* (2013.01);
(Continued)

(58) Field of Classification Search
CPC ............ B60H 1/00985; B60H 1/00828; B60H 1/00821; B60H 1/00021; B60H 1/00871; B60H 2001/00185
See application file for complete search history.

(56) References Cited

U.S. PATENT DOCUMENTS 8,988,247 B1 * 3/2015 Lee .................. G08C 17/02
340/815.6
10,029,537 B2 * 7/2018 Horiuchi ............ B60H 1/00842
(Continued)

FOREIGN PATENT DOCUMENTS

DE    102012016109 A1 *  2/2014  ........ B60H 1/00871
JP    S57147105 U        9/1982
(Continued)

*Primary Examiner* — Nelson J Nieves
(74) *Attorney, Agent, or Firm* — Harness, Dickey & Pierce, P.L.C.

(57) ABSTRACT

A vehicle air condition display device used together with a vehicle air-conditioning apparatus includes a display unit and a display controller. The vehicle air-conditioning apparatus is capable of adjusting a direction of an air blown out from an outlet port in response to an operation made on an operation portion located away from the outlet port, and has a mechanism for adjusting a direction of the air blown out from the outlet port. The mechanism is located on upstream of the outlet port in a flow path of the air. The vehicle air condition display device includes a display unit disposed at a visually recognizable position from a driver's seat in a vehicle compartment and a display controller displaying a direction of the air blown out from the outlet port on the display unit.

10 Claims, 5 Drawing Sheets

(51) Int. Cl.
  *B60R 11/02* (2006.01)
  *B60K 35/00* (2006.01)
  *B60K 37/00* (2006.01)
(52) U.S. Cl.
  CPC .......... *B60H 1/345* (2013.01); *B60R 11/0229* (2013.01); *B60R 11/0264* (2013.01); *B60K 35/00* (2013.01); *B60K 37/00* (2013.01)

(56) References Cited

U.S. PATENT DOCUMENTS

| | | | |
|---|---|---|---|
| 2004/0142653 A1 | 7/2004 | Gehring et al. | |
| 2009/0312900 A1* | 12/2009 | Tschirhart | B60H 1/00985 701/36 |
| 2012/0330507 A1* | 12/2012 | Auner | B60H 1/00985 701/36 |
| 2013/0047112 A1* | 2/2013 | Waller | B60H 1/00985 715/771 |
| 2014/0058633 A1* | 2/2014 | Kuroda | B60R 16/02 701/49 |
| 2015/0061841 A1* | 3/2015 | Lee | G08C 17/02 340/12.5 |
| 2015/0105976 A1* | 4/2015 | Shikii | G06F 3/0488 701/36 |
| 2015/0204556 A1* | 7/2015 | Kusukame | B60H 1/00742 165/237 |
| 2015/0328958 A1* | 11/2015 | Winget, Jr. | B60H 1/00742 454/155 |
| 2016/0229264 A1* | 8/2016 | Horiuchi | B60H 1/00842 |
| 2016/0263966 A1* | 9/2016 | Livingston | B60H 1/00964 |
| 2016/0306532 A1* | 10/2016 | Ko | G06F 3/04847 |
| 2016/0347151 A1* | 12/2016 | Arakawa | G06F 3/04847 |
| 2017/0282717 A1* | 10/2017 | Jang | B60K 37/06 |
| 2018/0208017 A1* | 7/2018 | Hernandez | B60H 1/00985 |
| 2018/0265043 A1* | 9/2018 | Salter | B60S 1/026 |

FOREIGN PATENT DOCUMENTS

| | | |
|---|---|---|
| JP | H06191264 A | 7/1994 |
| JP | H11078483 A | 3/1999 |
| JP | H11208246 A | 8/1999 |
| JP | 2004276731 A | 10/2004 |
| JP | 2008265675 A * | 11/2008 |
| JP | 2008296837 A | 12/2008 |
| JP | 2010000820 A | 1/2010 |
| JP | 2012106701 A | 6/2012 |
| JP | 2012166669 A | 9/2012 |
| JP | 2013082379 A | 5/2013 |
| WO | WO-2016143455 A1 | 9/2016 |
| WO | WO-2016158100 A1 | 10/2016 |

\* cited by examiner

VEHICLE AIR CONDITION DISPLAY DEVICE

CROSS REFERENCE TO RELATED APPLICATIONS

This application is a U.S. National Phase Application under 35 U.S.C. 371 of International Application No. PCT/JP2016/001534 filed on Mar. 17, 2016 and published in Japanese as WO 2016/157791 A1 on Oct. 6, 2016. This application is based on and claims the benefit of priority from Japanese Patent Application No. 2015-076212 filed on Apr. 2, 2015. The entire disclosures of all of the above applications are incorporated herein by reference.

TECHNICAL FIELD

The present disclosure relates to a vehicle air condition display device used to display an air conditioning state in a vehicle.

BACKGROUND ART

Patent Literature 1 discloses an air conditioning control device equipped to a vehicle. The device includes an operation portion to set three air conditioning states, more specifically, an operation portion to make settings as to switching of outlet ports, a change of a volume of air, and a change of a temperature. The operation portion includes a push knob used to select any one of the three air conditioning states, and a dial knob provided along an outer periphery of the push knob.

The air conditioning control device of Patent Literature 1 includes a liquid crystal display unit disposed next to the operation portion and displaying an air conditioning state selected by the operation portion. The liquid display unit displays from which outlet port air is blown out, a volume of air blown out from the outlet port, and a pre-set temperature.

A technique of adjusting a direction of air blown out from one outlet port according to an orientation of a louver fitted to the outlet port has been used extensively in the related art. An air direction adjusting device disclosed in Patent Literature 2 changes rightward and leftward orientations of a louver fitted to an outlet port by moving an operation element mechanically coupled to the louver from one side to the other side. An operation knob is mechanically coupled to the louver besides the operation element. An orientation of the louver is changed, by moving the operation knob from side to side, to make a spacing narrower on a downstream side than on an upstream side in a flow of air or conversely to make a spacing wider on the downstream side than on the upstream side. A degree of concentration and diffusion of air thus varies with an orientation of the louver. Further, a shutter operation knob is mechanically coupled to the louver besides the operation knob and the operation element. The outlet port is opened or closed by rotating the shutter operation knob clockwise or counterclockwise.

Patent Literatures 3 through 6 disclose a widely employed technique which employs an electronic control for adjusting a direction of air blown out from an outlet from side to side and up and down, adjusting a concentration and diffusion degree of air, and closing and opening a flow path of air, on an upstream side of the outlet port in the flow path of air.

PRIOR ART LITERATURES

Patent Literatures

Patent Literature 1: JP 2012-166669 A
Patent Literature 2: JP H6-191264 A
Patent Literature 3: JP 2008-296837 A
Patent Literature 4: JP 2010-820 A
Patent Literature 5: JP H11-78483 A
Patent Literature 6: JP H11-208246 A

SUMMARY OF INVENTION

A vehicle air-conditioning apparatus may be configured in such a manner that a direction of air blown out from one outlet port can be set by an operation portion located away from the outlet port. In a case where a direction of air blown out from one outlet port is adjustable by the operation portion located away from the outlet port, it is difficult for a user to specify a direction of air blown out from the outlet port when only the outlet port from which the air is blown out is displayed to the user as disclosed in Patent Literature 1.

Particularly, in a case where an air direction adjusting mechanism is located upstream of the outlet port in a flow path of air, it is difficult to know a direction of air blown out from the outlet port by looking at the outlet port.

In view of the foregoing difficulties, it is an object of the present disclosure to provide a vehicle air condition display device used together with a vehicle air conditioning apparatus and showing a direction of air blown out from an outlet port in an easy-to-understand manner.

According to an aspect of the present disclosure, a vehicle air condition display device used together with a vehicle air-conditioning apparatus is provided. The vehicle air-conditioning apparatus is capable of adjusting a direction of an air blown out from an outlet port in response to an operation made on an operation portion located away from the outlet port, and the vehicle air conditioning apparatus has a mechanism for adjusting a direction of the air blown out from the outlet port. The mechanism is located on upstream of the outlet port in a flow path of the air. The vehicle air condition display device includes a display unit disposed at a visually recognizable position from a driver's seat in a vehicle compartment and a display controller displaying a direction of the air blown out from the outlet port on the display unit.

According to the vehicle air condition display device configured as above, a direction of air blown out from the outlet port is displayed on the display unit disposed at a visually recognizable position from the driver's seat. Hence, anyone operating the operation portion can readily know a direction of air blown out from the outlet port by looking at the display unit.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Hereinafter, an embodiment will be described using drawings.

(Configuration of Vehicle Air-Conditioning System 100)

Figure 1:
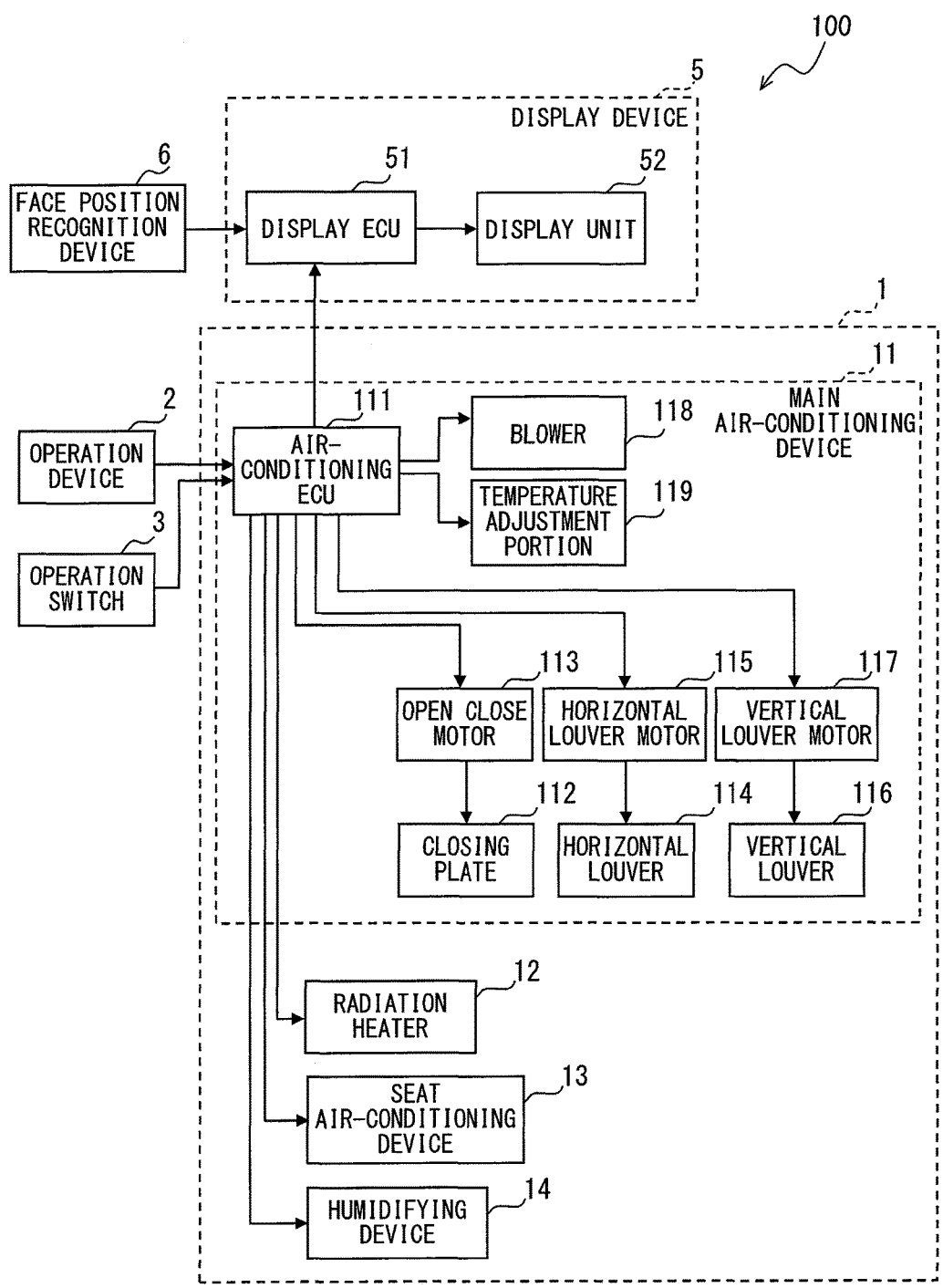
FIG. 1 is a block diagram showing a configuration of a vehicle air-conditioning system according to an embodiment.

A vehicle air-conditioning system 100 shown in FIG. 1 is equipped to a vehicle. The vehicle air-conditioning system 100 includes a vehicle air-conditioning apparatus (hereinafter, referred to simply as the air-conditioning apparatus) 1, an operation device 2, an operation switch 3, a display device 5, and a face position recognition device 6. Hereinafter, a vehicle equipped with the vehicle air-conditioning system 100 is referred to as an own vehicle.

The air-conditioning apparatus 1 includes multiple components for air-conditioning. More specifically, the air-conditioning apparatus 1 includes a main air-conditioning device 11, a radiation heater 12, a seat air-conditioning device 13, and a humidifying device 14.

One or more than one radiation heater 12 may be provided at a predetermined position, such as in a lower part of a dashboard or a lower part of a front seat.

The seat air-conditioning device 13 is disposed inside a seat and provides air conditioning to an occupant seated in the seat through the seat. Various known methods are adoptable to the seat air-conditioning device 13. For example, one method may be to provide an inlet port inside the seat for the seat air-conditioning device 13 to draw air in the vehicle compartment, and another method may be to provide a duct inside the seat to pass cooling air and heating air through the duct. The humidifying device 14 humidifies the compartment.

The main air-conditioning device 11 is a device which makes adjustments (that is, provides air conditioning) relating to air blown out from multiple outlet ports 4 (see FIG. 2) provided in the compartment of the own vehicle. The main air-conditioning device 11 may include a configuration in which one or more than one air inlet port is provided to the compartment to draw air in the compartment inside from the air inlet port.

Air conditioning provided by the main air-conditioning device 11 using the outlet ports 4 is as follows. That is, the outlet ports 4 are opened and closed, a degree of concentration and diffusion of blown air is adjusted, a direction of blown air (hereinafter, referred to simply as a direction of air) is adjusted, a temperature of blown air is adjusted, a volume of blown air (hereinafter, referred to simply as a volume of air) is adjusted, and the outlet port 4 from which to blow out air is selected. Air conditioning relating to the inlet port may include adjustment of a flow rate of air drawn inside from the inlet port. The outlet ports 4 and the inlet ports may also be referred to collectively as air conditioning ports.

Figure 2:
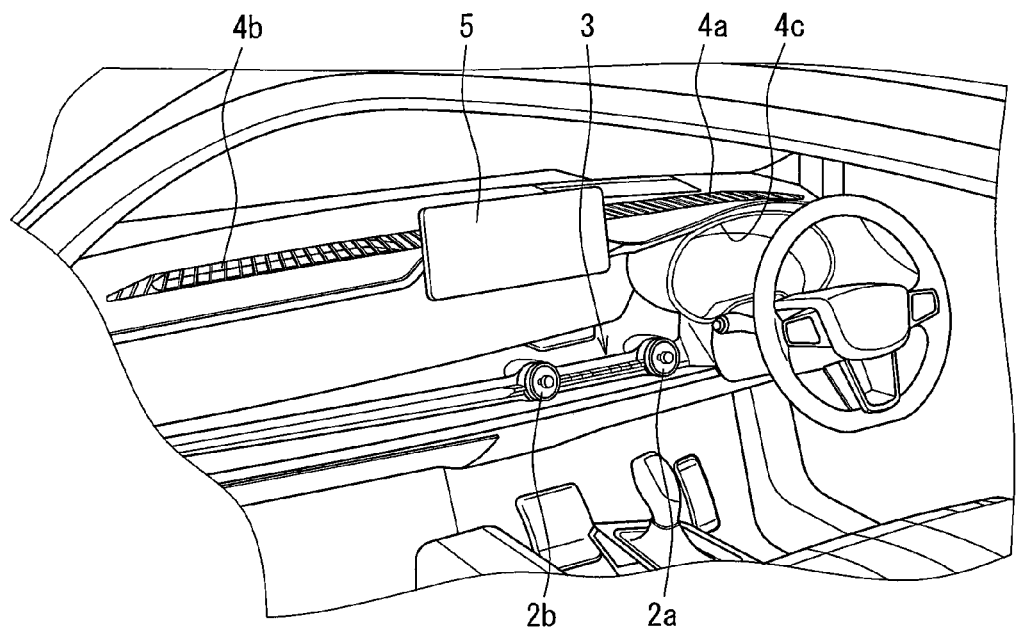
FIG. 2 is a perspective view showing a vicinity of a dashboard of a vehicle equipped with the vehicle air-conditioning system.

Three outlet ports 4a, 4b, and 4c are shown in FIG. 2. The outlet ports 4a, 4b, and 4c are referred to simply as outlet ports 4 when there is no need to distinguish them from one another. Besides the three outlet ports 4a, 4b, and 4c, the outlet ports 4 may be provided in a lower part of an instrument panel, a back surface of a front seat, and under the front seat.

The outlet port 4a is provided near a front windshield in front of a driver's seat. The outlet port 4b is provided near the front windshield in front of a front passenger's seat. Hence, the outlet ports 4a and 4b are out of a reachable range of a driver with hands when the driver is seated in the driver's seat. The outlet ports 4a and 4b are of a long linear shape extending in a vehicle width direction. Meanwhile, the outlet port 4c is provided in a clearance of a meter hood.

A description will be given by referring to FIG. 1 again. Operation devices 2a and 2b are operation devices to open and close the respective corresponding outlet ports 4, adjust a degree of concentration and diffusion of air blown out from the respective corresponding outlet ports 4, and adjust a direction of air blown out from the respective corresponding outlet ports 4. The two operation devices 2a and 2b are simply referred to as the operation devices 2 when there is no need to distinguish them from each other. The operation devices 2 correspond to an operation portion.

As is shown in FIG. 2, the operation devices 2a and 2b are provided at positions near a center of the dashboard of the own vehicle in the width direction, and each is protruded from the dashboard toward a rear side of the compartment.

Of the two operation devices 2a and 2b, the operation device 2a on a right side is a driver's seat operation device and the operation device 2b on a left side is a front passenger's seat operation device. The operation devices 2a and 2b are at positions operable by the driver seated in the driver's seat. The front passenger's seat operation device 2b is at a position operable by the driver seated in the driver's seat and also by an occupant seated in a front passenger's seat.

The driver's seat operation device 2a opens and closes the driver's seat outlet port 4a, and the front passenger's seat operation device 2b opens and closes the front passenger's seat outlet port 4b.

The operation switch 3 is a switch used to make adjustments relating to air conditioning other than types of air conditioning that can be set by the operation devices 2. For example, the operation switch 3 may be a switch which enables selection of the outlet ports 4, setting of an air-conditioning temperature, setting of a volume of air, operation of the radiation heater 12, and operation of the seat air-conditioning device 13. The operation switch 3 that operates the seat air-conditioning device 13 may be provided near each seat.

The display device 5 as a vehicle air condition display device includes a display ECU 51 and a display unit 52. The display unit 52 is capable of displaying color images and may be provided by a liquid crystal display or the like. The display ECU 51 corresponds to a display controller and controls the display unit 52 to display an air conditioning state, such as a direction of air set in the air-conditioning apparatus 1.

The display unit 52 is provided at an easy-to-see position for the driver driving the own vehicle. More specifically, in the present embodiment, as is shown in FIG. 2, the display unit 52 is provided on the dashboard of the own vehicle near a center of the dashboard in the vehicle width direction. Hence, the display unit 52 is provided more close to a vehicle front side compared with the operation devices 2 and the operation switch 3.

The display device 5 may serve also as an in-vehicle system different from the vehicle air-conditioning system 100, for example, an audio system. Alternatively, the display device 52 may be a HUD (Head-Up Dispray).

The face position recognition device 6 is of a known configuration including a camera capturing an image of a face and a periphery area of the face of a front seat occupant, and a controller determining a face position of the front seat occupant by analyzing an image captured by the camera. The face position recognition device 6 successively outputs signals indicating the determined face position of the front seat occupant (that is, the driver and an occupant seated on the front passenger's seat) to the display ECU 51.

(Description of Operation Devices 2)

Figure 3:
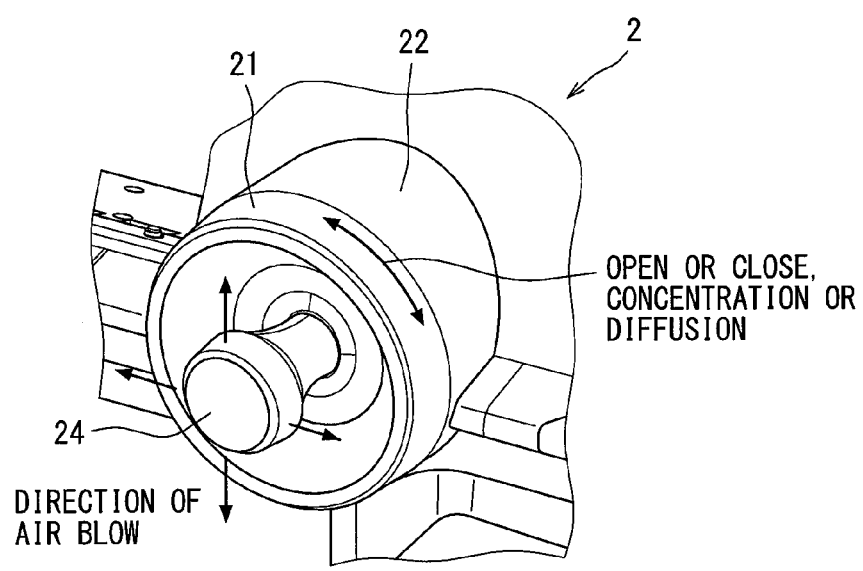
FIG. 3 is a perspective view showing an appearance of an operation device of FIG. 1.

As is shown in FIG. 3, each operation device 2 has a cylindrical base 22 fixed to the dashboard. The base 22 has a substantially cylindrical shape. The base 22 is provided in such a manner that a shaft center is parallel to a front-rear direction of the own vehicle.

A cylindrical operation device 21 also has a cylindrical shape. The cylindrical operation device 21 is fit to the base 22 and is configured to rotate both clockwise and counter-clockwise relative to the base 22. The cylindrical operation portion 21 is configured to be operated by an occupant to open and close the corresponding outlet port 4 or to adjust a degree of concentration and diffusion of air blown out from the corresponding outlet port 4. Herein, the corresponding outlet port 4 is an outlet port controlled by the operation device 2 equipped with the operated operation portion 21.

In the present embodiment, rotatable positions of the cylindrical operation portion 21 relative to the base 22 include four positions: "close", "concentrate", "normal", and "diffuse". The "close" position is a position to which the cylindrical operation portion 21 is rotated to block air from blowing out from the outlet port 4 corresponding to the operated operation device 2. The "concentrate" position is a position to which the cylindrical operation portion 21 is rotated to blow out air concentrated in a narrow width from the outlet portion 4 corresponding to the operated operation device 2. The "diffuse" position is a position to which the cylindrical operation portion 21 is rotated to blow out air spread in a wide width from the outlet port 4 corresponding to the operated operation device 2. The "normal" position is a position to which the cylindrical operation portion 21 is rotated to blow out air from the outlet port 4 corresponding to the operated operation device 2 in a more diffused manner than at the "concentrate" position and in a more concentrated manner than at the "diffuse" position.

The four positions are changed in order of "close", "concentrate", "normal", and "diffuse" while the cylindrical operation portion 21 is rotated in one direction relative to the base 22 and changed in order of "diffuse", "normal", concentrate", and "close" while the cylindrical operation portion 21 is operated in an opposite direction.

When the cylindrical operation device 21 is rotated to any one of the "close", "concentrate", "normal", and "diffuse" positions, the operation device 2 outputs a signal indicating the position to an air-conditioning ECU 111.

The operation device 2 includes a stick operation portion 24 to adjust a direction of air. The stick operation portion 24 can be set at a position at which a shaft center coincides with the shaft center of the cylindrical operation portion 21. The stick operation portion 24 set at such a position is configured to tilt at a tip end to move away from the shaft center of the cylindrical operation portion 21 in upward, downward, rightward, and leftward directions. The operation device 2 not only outputs a signal indicating a position of the cylindrical operation portion 21 to the air-conditioning ECU 111, but also outputs a signal indicating a tilting direction of the stick operation portion 24 to the air-conditioning ECU 111.

(Description of Main Air-Conditioning Device 11)

A configuration of the main air-conditioning device 11 will now be described using FIG. 1. As is shown in FIG. 1, the main air-conditioning device 11 includes the air-conditioning ECU 111, a closing plate 112, an open close motor 113, a horizontal louver 114, a horizontal louver motor 115, a vertical louver 116, a vertical louver motor 117, a blower 118, and a temperature adjustment portion 119.

The closing plate 112 is a movable plate to close a flow path of air on an upstream side of the outlet port 4 in the flow path of air, and provided to some or all of the outlet ports 4. The open close motor 113 is a motor that drives the respective closing plates 112 individually.

The horizontal louver 114 is provided upstream of the outlet ports 4a and 4b in the flow path of air and near the outlet ports 4a and 4b. The horizontal louver 114 is provided at a visually unrecognizable position from the driver seated in the driver's seat.

The horizontal louver 114 includes multiple slats formed to extend in a longer-side direction of the outlet ports 4a and 4b (that is, the width direction of the own vehicle). The multiple slats are aligned one by one at intervals in a shorter-side direction of the outlet ports 4a and 4b. Each slat of the horizontal louver 114 is disposed in a rotatable manner about a shaft extending in the longer-side direction of the outlet ports 4a and 4b.

The horizontal louver motor 115 is a motor driving the shafts of the respective slats of the horizontal louver 114, and includes, for example, multiple motors to drive the shafts of the respective slats individually.

The vertical louver 116 is also provided upstream of the outlet ports 4a and 4b in the flow path of air and near the outlet ports 4a and 4b. The vertical louver 116 is also provided at a visually unrecognizable position from the driver seated in the driver's seat.

The vertical louver 116 includes multiple slats formed to extend in the shorter-side direction of the outlet ports 4a and 4b. The multiple slats are aligned one by one at intervals in the longer-side direction of the outlet ports 4a and 4b. Each slat of the vertical louver 116 is disposed in a rotatable manner about a shaft extending in the shorter-side direction of the outlet ports 4a and 4b.

The vertical louver motor 117 is a motor driving the shafts of the respective slats of the vertical louver 116, and includes, for example, multiple motors to drive the shafts of the respective slats individually.

An orientation of the horizontal louver 114 is controlled by the horizontal louver motor 115. As a result, upward and downward directions of air blown out from the outlet port 4 located downstream of the horizontal louver 114 are adjusted. Likewise, an orientation of the vertical louver 116 is controlled by the vertical louver motor 117. As a result, rightward and leftward directions of air blown out from the outlet port 4 located downstream of the vertical louver 116 are adjusted. In the present embodiment, the horizontal louver 114, the vertical louver 116, the horizontal louver motor 115, and the vertical louver motor 117 together configure a mechanism which adjusts a direction of air blown out from the outlet port 4.

The blower 118 adjusts a volume of air blown out from the outlet port 4. The temperature adjustment portion 119 includes a heat exchanger and adjusts a temperature of air blown out from the outlet port 4. Owing to the presence of the blower 118 and the temperature adjustment portion 119, the main air-conditioning device 11 is capable of adjusting a volume of air blown out from the outlet port 4 and adjusting a temperature of air blown out from the outlet port 4.

The air-conditioning ECU 111 includes a CPU and memories, such as a ROM and RAM, and performs processing relating to air conditioning of the own vehicle by running a control program pre-stored in the ROM according to signals inputted from the operation devices 2 and the operation switch 3.

For example, the air-conditioning ECU 111 switches the outlet ports 4 from which air is to be blown out by controlling the open close motor 113 according to a signal inputted from the operation switch 3. The air-conditioning ECU 111 adjusts a volume of air and a temperature of air by controlling the blower 118 and the temperature adjustment portion 119 according to a signal inputted from the operation switch 3. The air-conditioning ECU 111 controls the radiation heater 12, the seat air-conditioning device 13, and the humidifying device 14 according to a signal inputted from the operation switch 3.

The air-conditioning ECU 111 also adjusts opening or closing of the outlet ports 4a and 4b and a degree of concentration and diffusion of air blown out from the respective outlet ports 4a and 4b according to signals inputted from the corresponding operation devices 2. In the present embodiment, opening or closing of the outlet port 4 and adjustment of a degree of air concentration and diffusion are performed at the four steps described above: "close", "concentrate", "normal", and "diffuse".

When the cylindrical operation portion 21 is rotated to the "close" position, the air-conditioning ECU 111 drives the open close motor 113 to move the closing plate 112 provided upstream of the outlet port 4 so that the closing plate closes the flow path. As described above, the open close motor 113 is provided to move the closing plate 112.

When the cylindrical operation portion 21 is rotated to any one of the "concentrate", "normal", and "diffuse" positions, the air-conditioning ECU 111 drives the open close motor 113 to move the closing plate 112 provided upstream of the outlet port 4 so that the closing plate 112 opens the flow path for the air. As described above, the open close motor 113 is provided to move the closing plate 112.

When the cylindrical operation portion 21 is rotated to the "concentrate" position, the air-conditioning ECU 111 controls the vertical louver motor 117 to rotate the vertical louver 116 provided upstream of the outlet port 4 corresponding to the operation device 2 whose cylindrical operation portion 21 is rotated by the occupant. More specifically, the vertical louver motor 117 controls the vertical louver 116 by rotating the respective slats of the vertical louver 116 to make intervals between every two adjacent slats narrower toward a blowing direction. A width of blown air in a right-left direction is thus narrowed.

When the cylindrical operation portion 21 is rotated to the "concentrate" position, the air-conditioning ECU 111 may control, in addition to the vertical louver motor 117, the horizontal louver motor 115 to rotate the respective slats of the horizontal louver 114 to make an interval between every two adjacent slats narrower toward a blowing direction. In such a case, a width of air blown out from the outlet port 4 is narrowed also in a top-bottom direction. Alternatively, the air-conditioning ECU 111 may adjust blown air to concentrate in the top-bottom direction by only controlling the horizontal louver motor 115 without controlling the vertical louver motor 117.

When the cylindrical operation portion 21 is rotated to the "normal" position, the air-conditioning ECU 111 controls the same vertical louver motor 117 used in the case of the "concentrate" position to rotate the respective slats of the vertical louver 116 and align every two adjacent slats parallel to each other. Consequently, blown air is adjusted to be neither concentrated nor diffused exceedingly. In addition, the air-conditioning ECU 111 may control the horizontal louver motor 115 to rotate the respective slats of the horizontal louver 114 and align every two adjacent slats parallel to each other.

When the cylindrical operation portion 21 is rotated to the "diffuse" position, the air-conditioning ECU 111 controls the same vertical louver motor 117 used in the case of the "concentrate" position to rotate the respective slats of the vertical louver 116 and make an interval between every two adjacent slats wider toward a blowing direction. Air blown out from the outlet port 4 located downstream of the vertical louver 116 is thus diffused. In addition, the air-conditioning ECU 111 may control the horizontal louver motor 115 to rotate the respective slats of the horizontal louver 114 and make an interval between every two adjacent slats wider toward a blowing direction. In such a case, a width of blown air in the top-bottom direction is diffused. Alternatively, the air-conditioning ECU 111 may adjust blown air to diffuse in the top-bottom direction by controlling only the horizontal louver motor 115 without controlling the vertical louver motor 117.

The air-conditioning ECU 111 adjusts a direction of air blown out from the outlet port 4 corresponding to the operation device 2 including the tilted stick operation portion 24 according to a signal indicating a tilt of the stick operation portion 24.

For example, when a tilting direction of the stick operation portion 24 is an upward or downward direction of the own vehicle, the air-conditioning ECU 111 controls the horizontal louver motor 115 to rotate the respective slats of the horizontal louver 114 while maintaining intervals among the respective slats of the horizontal louver 114 on the side of the outlet port 4. Consequently, a direction of air is adjusted to an upward or downward direction of the own vehicle while a degree of concentration and diffusion of air is maintained.

When a tilting direction of the stick operation portion 24 is a rightward or leftward direction of the own vehicle, the air-conditioning ECU 111 controls the vertical louver motor 117 to rotate the respective slats of the vertical louver 116 while maintaining intervals among the respective slats of the vertical louver 116 on the side of the outlet port 4. Consequently, a direction of air is adjusted to a rightward or leftward direction of the own vehicle while a degree of concentration and diffusion of air is maintained. In the present embodiment, a direction of air is adjusted in four directions: upward, downward, rightward, and leftward directions. Alternatively, the four directions may be divided more finely by controlling both of the horizontal louver motor 115 and the vertical louver motor 117.

Partial or entire functions performed by the air-conditioning ECU 111 may be implemented by a hardware circuit in the form of a single or multiple integrated chips or the like.

(Example of Display Performed by Display Unit 52)

Figure 4:
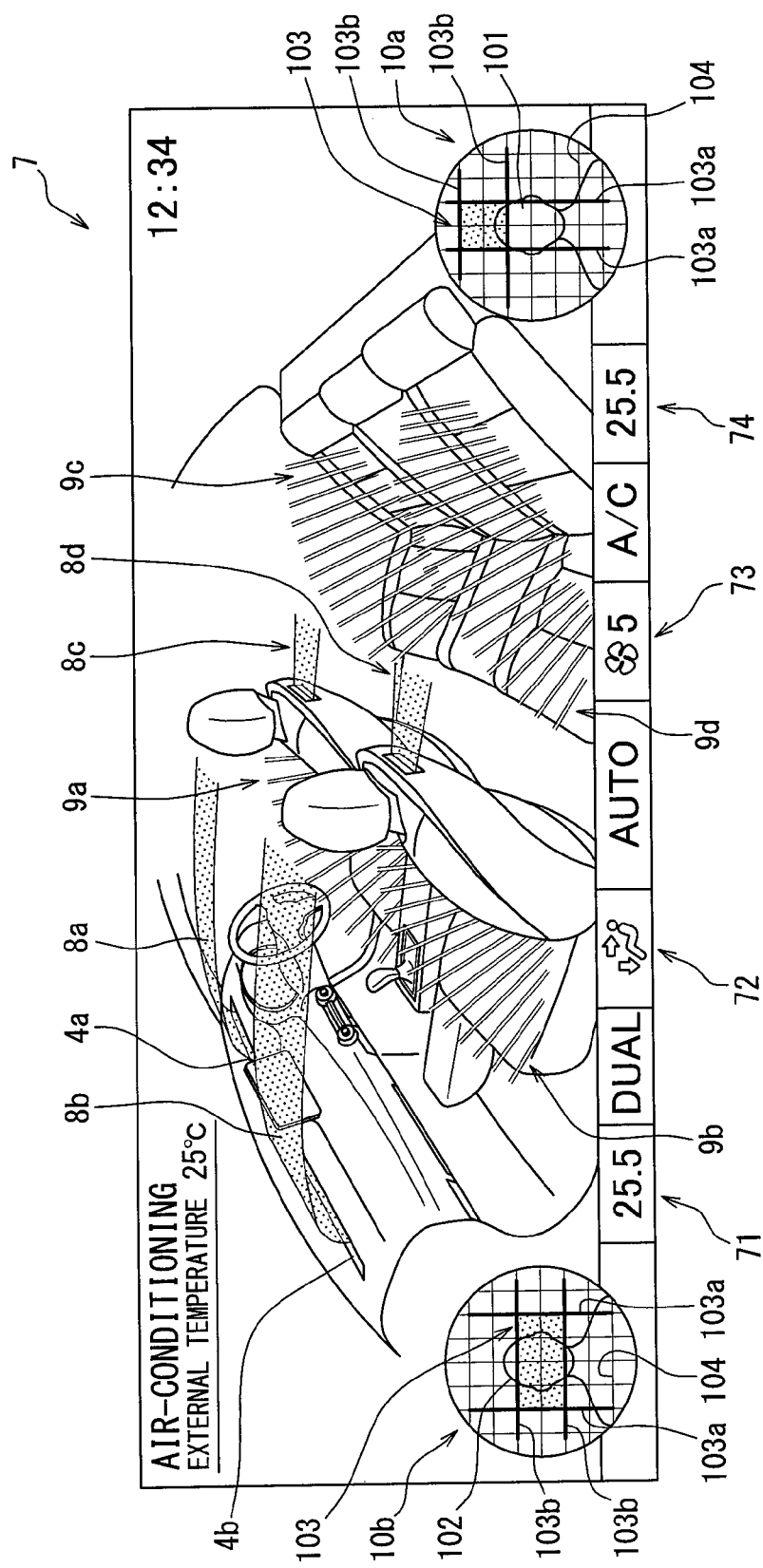
FIG. 4 is a compartment image displayed on a display unit by a display ECU.

FIG. 4 shows an image displayed on the display unit 52 by the display ECU 51. The image includes a compartment image 7. The compartment image 7 may be either an image of a compartment of a different type of vehicle equipped with the vehicle air-conditioning system 100 or an image of a compartment of a same type of vehicle equipped with the vehicle air-conditioning system 100.

The compartment image 7 is of a horizontally long rectangular shape and shows a vehicle compartment three-dimensionally. More specifically, the compartment image 7 is a three-dimensional image of the compartment viewed diagonally down from a rear part of the compartment. Hence, the compartment image 7 shows the outlet ports 4a and 4b. Multiple air information images 8 and air conditioning images 9 each indicating a state of air conditioning provided by the air-conditioning apparatus 1 are displayed in superimposed manner on the compartment image 7. The air information images 8 also correspond to an air conditioning images.

The air information images 8 are images representing information on air blown out from the multiple outlet ports 4. Referring to FIG. 4, the air information images 8 displayed in superimposed manner on the compartment image 7 include, to be more specific, air information images 8a through 8d. The air information image 8a extends from a vicinity of the outlet port 4a and represents information on air blown out from the outlet port 4a. The air information image 8b extends from a vicinity of the outlet port 4b and represents information on air blown out from the outlet port 4b. The air information image 8c represents information on air blown out from a back surface of the driver's seat toward a backseat. The air information image 8d represents information on air blown out from a back surface of the front passenger's seat toward the backseat.

Referring to FIG. 4, the air conditioning images 9 displayed in superimposed manner on the compartment image 7 include, to be more specific, an air conditioning image 9a indicating that air conditioning is provided to the driver's seat by the seat air-conditioning device 13, an air conditioning image 9b indicating that air conditioning is provided to the front passenger's seat by the seat air-conditioning device 13, an air conditioning image 9c indicating that air conditioning is provided to a right backseat by the seat air-conditioning device 13, and an air conditioning image 9d indicating that air conditioning is provided to a left backseat by the seat air-conditioning device 13.

All of the air information images 8 and the air conditioning images 9 are displayed in a color representing an air-conditioning temperature of regions corresponding to the respective air information images 8 and air conditioning images 9. The temperature referred to herein means a temperature relative to a room temperature when no air conditioning is provided. For example, when the temperature is below the room temperature, that is, in the case of cooling, the air information images 8 and the air conditioning images 9 are displayed in blue. In the case of cooling, the color does not have to be always same blue. Alternatively, density of the color may be changed according to a temperature difference from the room temperature.

The air information images 8 are of an elongate shape extending, in an air blowing direction, from the outlet ports 4 or a periphery of the outlet ports 4 corresponding to the respective air information images 8.

Figure 5:
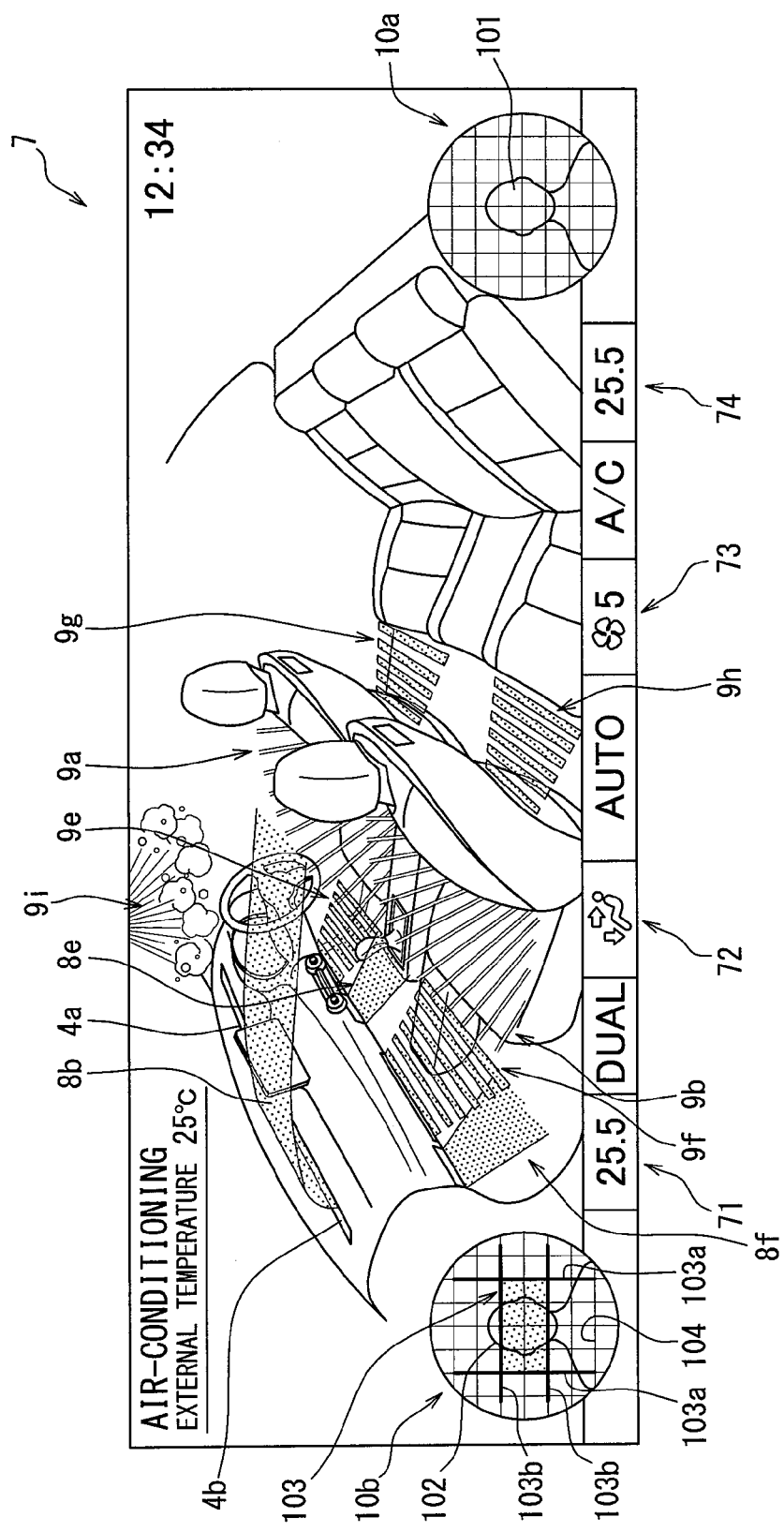
FIG. 5 is a compartment image displayed on the display unit by the display ECU in an example different from an example shown in FIG. 4.

FIG. 5 shows an example when air information images 8b, 8e, and 8f and air conditioning images 9a, 9b, 9e, 9f, 9g, 9h, and 9i, some of which are different from the images shown in FIG. 4, are displayed on the compartment image 7. In contrast to FIG. 4 showing a display example during cooling, FIG. 5 shows a display example during heating.

Referring to FIG. 5, the air information image 8e represents information on air blown out diagonally downward from a lower part of the dashboard in front of the driver's seat. The air information image 8f represents information on air blown out diagonally downward from a lower part of the dashboard in front of the front passenger's seat.

The air conditioning image 9e is an image indicating that air conditioning is provided by the radiation heater 12 disposed in a lower part of the dashboard in front of the driver's seat. The air conditioning image 9f is an image indicating that air conditioning is provided by the radiation heater 12 disposed in a lower part of the dashboard in front of the front passenger's seat. The air conditioning image 9g is an image indicating that air conditioning is provided by the radiation heater 12 disposed in a lower part of the driver's seat. The air conditioning image 9h is an image indicating that air conditioning is provided by the radiation heater 12 disposed in a lower part of the front passenger's seat. The air conditioning image 9i is an image indicating that the humidifying device 14 is in operation.

Referring to FIG. 5, all of the air information images 8 and the air conditioning images 9 are also displayed in a color indicating an air-conditioning temperature corresponding to the respective air information images 8 and air conditioning images 9. As has been described, FIG. 5 shows a display example during heating, and a color of the air information images 8 and the air conditioning images 9 during heating is, for example, orange.

Similar to the case of cooling, the color of the air information images 8 and the air conditioning images 9 does not have to be always same orange in the case of heating, either, and density of the color may be changed according to a temperature difference from the room temperature.

The air information images 8e and 8f are also images extending, in an air blowing direction, from the outlet ports 4 or vicinities of the outlet ports 4 corresponding to the respective air information images 8e and 8f.

A direction and a degree of concentration and diffusion of air blown out from the respective outlet ports 4a and 4b are adjustable. Hence, the air information images 8a and 8b representing information on air blown out from the respective outlet ports 4a and 4b change directions according to a direction of air, and change widths according to a degree of concentration and diffusion. Every air information image 8 becomes longer as a volume of air increases. In short, a length varies with a volume of air.

In the display examples shown in FIGS. 4 and 5, a front passenger's seat pre-set temperature 71, an operating outlet port FIG. 72 which is a figure indicating which outlet port 4 is blowing out air, a pre-set air volume FIG. 73, and a driver's seat pre-set temperature 74 are also displayed at a bottom of the compartment image 7.

Face and peripheral area images 10a and 10b are also displayed on the display unit 52, respectively, in right and left lower parts of the compartment image 7 at positions each of which overlaps with the compartment image 7.

The face and peripheral area image 10a on the right is an image including a driver image 101 showing a face of the driver and a periphery of the driver viewed from a front side of a vehicle. In the present embodiment, the driver image 101 is an image prepared in advance instead of an actually captured image of the driver. Alternatively, an actually captured image of the driver may be used as the driver image 101.

The face and peripheral area image 10a shows a preliminarily fixed area. Meanwhile, the display ECU 51 obtains a signal indicating a face position of the driver from the face position recognition device 6 and displays the driver image 101 within the face and peripheral area image 10a at a position matching the face position of the driver indicated by the obtained signal. Hence, the position of the driver image 101 moves according to the face position of the driver detected by the face position recognition device 6.

The face and peripheral area image 10b on the left is an image including a front passenger's seat occupant image 102 showing a face of a front passenger's seat occupant and a periphery of the front passenger's seat occupant viewed from a front side of a vehicle. The front passenger's seat occupant image 102 is also an image prepared in advance instead of an actually captured image of the front passenger's seat occupant. Alternatively, an actually captured image of the front passenger's seat occupant may be used as the front passenger's seat occupant image 102.

The face and peripheral area image 10b is also a preliminarily fixed area. Meanwhile, the front passenger's seat occupant image 102 moves according to a face position of the front passenger's seat occupant detected by the face position recognition device 6 as does the driver image 101.

An air direction FIG. 103 is displayed in superimposed manner on the face and peripheral area images 10a and 10b shown in FIG. 4 and on the face and peripheral area image 10b shown in FIG. 5. The air direction FIG. 103 is an image representing a direction to which air blown out from the respective outlet ports 4a and 4b is headed by a rectangular range enclosed by two parallel vertical lines 103a and two parallel horizontal lines 103b.

The rectangular range of the air direction FIG. 103 displayed in superimposed manner on the face and peripheral area image 10a on the right is located directly above a head position in the driver image 101. A length in the right-left direction and a length in the top-bottom direction indicating a rough size of the rectangular range are comparable to three grid-like scale lines 104 aligned at regular intervals.

It is understood from the air direction FIG. 103 that air blown out from the outlet port 4a passes through a narrow range directly above the driver.

By contrast, a rectangular range of the air direction FIG. 103 displayed in superimposed manner on the face and peripheral area image 10b on the left in FIGS. 4 and 5 passes a face position in the front passenger's seat occupant image 102. A length of the rectangular range in the right-left direction is comparable to five scale lines 104. It is therefore understood from the air direction FIG. 103 that air blown out from the outlet port 4b heads for the face and the periphery of the face of the front passenger's seat occupant in a relatively wide width in the horizontal direction.

Summary of the Embodiment

In the present embodiment described above, a direction of air blown out from the outlet port 4 is displayed on the display unit 52 provided at a visually recognizable position from the driver's seat. Hence, a user operating the operation device 2 can easily know a direction of air blown out from the outlet port 4 by looking at the display unit 52.

In particular, in the present embodiment, the compartment image 7 showing a vehicle compartment three-dimensionally is displayed on the display unit 52 and the air information images 8a through 8f extending from the outlet ports 4 or peripheries of the outlet ports 4 in an air blowing direction are displayed in superimposed manner on the compartment image 7. Hence, by looking at the display unit 52 on which the air information images 8a through 8f are displayed in superimposed manner on the compartment image 7, the driver can know a direction of air blown out from the respective outlet ports 4 corresponding to the multiple air information images 8a through 8f at a time.

By displaying the air information images 8 superimposed on the compartment image 7 showing a vehicle compartment three-dimensionally, the driver looking at the display unit 52 can know not only a direction of air, but also various types of information on air blown out from the respective outlet ports 4 at a time.

More specifically, the air information images 8 change lengths according to a volume of air. Hence, the driver can also know a volume of air blown out from the respective multiple outlet ports 4 at a time. A degree of concentration and diffusion is adjustable at the outlet ports 4a and 4b, and the air information images 8a and 8b corresponding, respectively, to the outlet ports 4a and 4b change widths according to a degree of air concentration and diffusion. Hence, the driver can know a degree of concentration and diffusion of air blown out from the respective multiple outlet ports 4 at a time. Colors of the air information images 8 change according to a temperature of air. Hence, the driver can know a temperature of air blown out from the respective multiple outlet ports 4 at a time.

The air conditioning images 9 indicates that air conditioning is provided by the radiation heater 12, the seat air-conditioning device 13, and the humidifying device 14. The air condition images 9 are also displayed on the compartment image 7. Hence, by looking at the compartment image 7, the driver can know whether the radiation heater 12, the seat air-conditioning device 13, and the humidifying device 14 are in operation at a time.

In the present embodiment, while the operation devices 2 and the operation switch 3 are disposed within a reachable range of the driver seated in the driver's seat, the display unit 52 is provided closer to a vehicle front side compared with the operation devices 2 and the operation switch 3. Hence, when the driver checks an air conditioning state or changes an air conditioning state on the display unit 52 during driving, the frequent and amount of movement of a line of sight by the driver can be reduced.

In the present embodiment, a direction and a temperature of air blown out from the respective outlet ports 4a and 4b are indicated not only by showing a state of air blown out from the respective outlet ports 4 by the air information images 8, but also by displaying the air direction FIG. 103 superimposed on the face and peripheral area image 10.

By displaying the air information images 8 superimposed on the compartment image 7, entire information on air blown out from the multiple outlet ports 4 can be displayed at a time. Conventionally, it is difficult to show which position of the front seat occupant air is headed by displaying the air information images 8 superimposed on the compartment image 7. To overcome such a difficulty, the air direction FIG. 103 is displayed in superimposed manner on the face and peripheral area image 10. Consequently, the position toward where the front seat occupant air is headed can be shown to the front seat occupant in easy-to-understand manner.

While the above has described the embodiment, it should be appreciated that the embodiment described above is not one and only and the embodiment can be modified and extended in various manner, examples of which include modifications as follows.

(First Modification)

In the foregoing embodiment, the driver operates the air-conditioning apparatus 1 by using the operation devices 2 and the operation switch 3. Alternatively, the driver may operate the air-conditioning apparatus 1 by using a touch panel.

(Second Modification)

In the foregoing embodiment, a direction and a degree of concentration and diffusion of air blown out from the respective outlet ports 4a and 4b are adjustable. Alternatively, a direction and a degree of concentration and diffusion of air blown out from other outlet ports 4 except the outlet ports 4a and 4b may be made adjustable, too. Alternatively, a direction of air may be adjusted by using a Coanda effect.

(Third Modification)

In the foregoing embodiment, air blown out from the outlet port 4 is stopped by using the closing plate 112. Alternatively, air blown out from the outlet port 4 may be stopped by turning off the blower 18.

(Fourth Modification)

Figure 6:
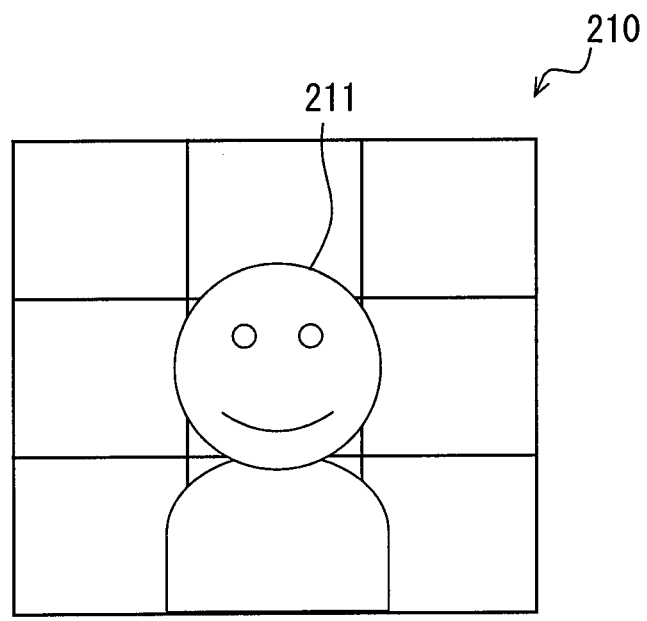
FIG. 6 is a display example of a face and peripheral area image.
Figure 7:
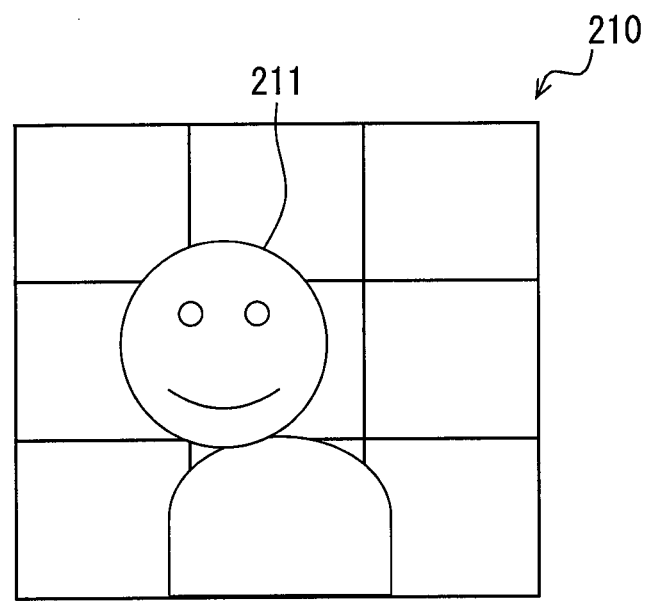
FIG. 7 is another display example of the face and peripheral area image.

FIGS. 6 and 7 show a face and peripheral area image 210 different from the face and peripheral area image 10 in the foregoing embodiment. A face position in a front seat occupant image 211 of FIG. 7 is different from a face position in the front seat occupant image 211 of FIG. 6. It is understood from FIGS. 6 and 7 that the front seat occupant image 211 representing a face image of a front seat occupant moves with a face position of the front seat occupant detected by the face position recognition device 6.

The invention claimed is:

1. A vehicle air condition display device used together with a vehicle air-conditioning apparatus of a vehicle, wherein the vehicle air-conditioning apparatus is configured to adjust a direction of an air blown out from an outlet port in response to an operation made on an operation portion located away from the outlet port, the vehicle air-conditioning apparatus has a louver for adjusting the direction of the air blown out from the outlet port, and the louver is located on upstream of the outlet port in a flow path of the air, the vehicle air condition display device comprising:
a display disposed at a visually recognizable position from a driver's seat in a vehicle compartment; and
a display controller displaying the direction of the air blown out from the outlet port on the display, wherein
the display controller displays a compartment image indicating the vehicle compartment on the display, and displays an air conditioning image indicating a state of an air conditioning provided by the vehicle air-conditioning apparatus in a superimposed manner on the compartment image at a position where the air conditioning is provided by the vehicle air-conditioning apparatus,
the display controller displays, as the air conditioning image, an air information image, which extends from the outlet port or from a periphery area of the outlet port in a blowing direction of the air, in the superimposed manner on the compartment image,
the vehicle air-conditioning apparatus is configured to adjust a degree of concentration and diffusion of the air blown out from the outlet port,
the air information image changes a width according to the degree of concentration and diffusion,
the vehicle air-conditioning apparatus is configured to adjust the direction of the air blown out from the outlet port to a direction heading a partial area selected from a face and peripheral area,
the face and peripheral area includes a face of a front seat occupant of the vehicle and a periphery area of the face of the front seat occupant, the compartment image is a three-dimensional image showing the vehicle compartment viewed diagonally down from a rear part of the vehicle compartment,
in addition to the compartment image, the display controller displays, on the display, an air direction figure indicating a direction to which the air blown out from the outlet port is headed on the face and peripheral area in a superimposed manner on a face and peripheral area image,
the face and peripheral area image displayed on the display indicates the face and peripheral area of the front seat occupant viewed from a front side of the vehicle,
the vehicle is equipped with a camera detecting a face position of the front seat occupant, and
the display controller moves a position of a face image showing the face of the front seat occupant within the face and peripheral area image according to the face position of the front seat occupant detected by the camera.

2. The vehicle air condition display device according to claim 1, wherein
the vehicle air-conditioning apparatus is configured to adjust a volume of the air blown out from the outlet port, and
the air information image changes a length according to the volume of the air.

3. The vehicle air condition display device according to claim 1, wherein
the vehicle air-conditioning apparatus includes a plurality of outlet ports, including the outlet port,
the display controller displays a plurality of air information images, including the air information image, in the superimposed manner on the compartment image, and
each of the plurality of air information images corresponds to the air blown out from each of the plurality of the outlet ports.

4. The vehicle air condition display device according to claim 1, wherein
the air conditioning image is displayed in a color corresponding to a temperature of the air conditioning provided by the vehicle air-conditioning apparatus.

5. The vehicle air condition display device according to claim 1, wherein
the display is positioned closer to a front side of the vehicle in the vehicle compartment compared with the operation portion.

6. A vehicle air condition display device used together with a vehicle air-conditioning apparatus of a vehicle, wherein the vehicle air-conditioning apparatus is configured to adjust a direction of an air blown out from an outlet port in response to an operation made on an operation portion located away from the outlet port, the vehicle air-conditioning apparatus has a louver for adjusting the direction of the air blown out from the outlet port, and the louver is located on upstream of the outlet port in a flow path of the air, the vehicle air condition display device comprising:
a display disposed at a visually recognizable position from a driver's seat in a vehicle compartment; and
a display controller displaying the direction of the air blown out from the outlet port on the display, wherein
the vehicle air-conditioning apparatus is configured to adjust the direction of the air blown out from the outlet port to a direction heading a partial area selected from a face and peripheral area, the face and peripheral area includes a face of a front seat occupant of the vehicle and a periphery area of the face of the front seat occupant, the display controller displays, on the display, an air direction figure indicating a direction to which the air blown out from the outlet port is headed on the face and peripheral area in a superimposed manner on a face and peripheral area image, the face and peripheral area image displayed on the display indicates the face and peripheral area of the front seat occupant viewed from a front side of the vehicle, the vehicle is equipped with a camera detecting a face position of the front seat occupant, and the display controller moves a position of an image showing the face of the front seat occupant within the face and peripheral area image according to the face position of the front seat occupant detected by the camera.

7. The vehicle air condition display device according to claim 6, wherein, in addition to the face and peripheral area image on which the air direction figure is superimposed, the display controller displays a compartment image indicating the vehicle compartment on the display, and displays an air conditioning image indicating a state of an air conditioning provided by the vehicle air-conditioning apparatus in a superimposed manner on the compartment image at a position where the air conditioning is provided by the vehicle air-conditioning apparatus, the compartment image is a three-dimensional image showing the vehicle compartment viewed diagonally down from a rear part of the vehicle compartment, the display controller displays, as the air conditioning image, an air information image, which extends from the outlet port or from a periphery area of the outlet port in a blowing direction of the air, in the superimposed manner on the compartment image.

8. The vehicle air condition display device according to claim 7, wherein the vehicle air-conditioning apparatus is configured to adjust a volume of the air blown out from the outlet port, and the air information image changes a length according to the volume of the air.

9. The vehicle air condition display device according to claim 7, wherein the vehicle air-conditioning apparatus is configured to adjust a degree of concentration and diffusion of the air blown out from the outlet port, and the air information image changes a width according to the degree of concentration and diffusion.

10. The vehicle air condition display device according to claim 7, wherein the vehicle air-conditioning apparatus includes a plurality of outlet ports, including the outlet port, the display controller displays a plurality of air information images, including the air information image, in the superimposed manner on the compartment image, and each of the plurality of the air information images corresponds to the air blown out from each of the plurality of the outlet ports.

* * * * *